(12) United States Patent
Edwards et al.

(10) Patent No.: US 7,223,476 B2
(45) Date of Patent: May 29, 2007

(54) COMPOSITE FLAKES AND METHODS FOR MAKING AND USING THE SAME

(75) Inventors: Robert D. Edwards, Gibsonia, PA (US); Jackie L. Kulfan, Mars, PA (US); Calum H. Munro, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 216 days.

(21) Appl. No.: 10/866,894

(22) Filed: Jun. 14, 2004

(65) Prior Publication Data

US 2005/0277704 A1 Dec. 15, 2005

(51) Int. Cl.
*C08F 2/45* (2006.01)
*B29C 9/06* (2006.01)

(52) U.S. Cl. ............... 428/407; 428/402; 428/403; 428/404; 428/405; 264/13; 264/7; 264/10; 522/71; 522/74; 522/77; 522/79; 522/81; 522/83; 522/150; 522/153; 522/154; 522/182; 523/171; 527/212; 527/215; 527/222; 527/219

(58) Field of Classification Search ............... 522/71, 522/74, 77, 79, 81, 83, 150, 153, 154, 182; 523/171; 264/7, 10; 428/402, 403, 404, 428/405, 407; 427/212, 215, 219, 222
See application file for complete search history.

(56) References Cited

U.S. PATENT DOCUMENTS

| | | |
|---|---|---|
| 3,575,900 A | 4/1971 | Ponyik, Jr. ............ 260/21 |
| 3,876,603 A | 4/1975 | Makhlouf ............ 260/31.2 |
| 3,944,639 A | 3/1976 | Osajima et al. ............ 264/13 |
| 4,048,136 A | 9/1977 | Kobayashi et al. ...... 260/42.14 |
| 4,057,607 A | 11/1977 | Soehngen et al. ............ 264/28 |
| 4,434,009 A | 2/1984 | Banba ............ 106/290 |
| 4,750,940 A | 6/1988 | Higashi et al. ............ 106/290 |
| 5,332,767 A | 7/1994 | Reisser et al. ............ 523/209 |
| 5,505,991 A | 4/1996 | Schmid et al. ............ 427/215 |
| 6,242,527 B1 | 6/2001 | Mazur ............ 524/559 |
| 6,657,001 B1 | 12/2003 | Anderson et al. ............ 524/588 |
| 6,875,800 B2 | 4/2005 | Vanier et al. ............ 523/210 |
| 6,913,824 B2 * | 7/2005 | Culler et al. ............ 428/401 |
| 2002/0115777 A1 | 8/2002 | Wu et al. | |
| 2004/0063813 A1 | 4/2004 | Wu et al. | |

FOREIGN PATENT DOCUMENTS

| | | |
|---|---|---|
| EP | 0 280 749 | 7/1991 |
| EP | 1 041 124 | 10/2000 |
| EP | 0 892 023 | 12/2003 |
| WO | WO096/38506 | 12/1996 |
| WO | WO03/074614 | 9/2003 |

* cited by examiner

*Primary Examiner*—Sanza L. McClendon
(74) *Attorney, Agent, or Firm*—Diane R. Meyers; Donald R. Palladino

(57) ABSTRACT

Methods for making composite flakes are disclosed. The composite flakes are formed from particles and one or more monomers and/or resins or resin systems. The polymer matrix of the flakes is highly crosslinked and/or high molecular weight. Use of the particles in powder coatings is also disclosed.

37 Claims, No Drawings

COMPOSITE FLAKES AND METHODS FOR MAKING AND USING THE SAME

FIELD OF THE INVENTION

The present invention is directed to composite flakes comprising particles and a highly crosslinked resin and/or a high molecular weight resin, methods for making such flakes and methods for using such flakes in powder coatings.

BACKGROUND INFORMATION

Incorporation of particles, particularly metallic flake, into powder coatings can be difficult. Such particles are typically either extruded with the other components of the powder coating, or post-added to a coating after extrusion. Passing these particles through an extruder, however, can result in a loss of appearance or other characteristics and can alter the size and/or shape of the particles. For example, if metallic flake is extruded with the other components of a powder coating, the flake will become distorted and will also lose at least some of its luster as a result of the extrusion process. Post-addition of metallic flake can also cause problems, particularly when applying the powder coating by electrostatic spray; the metallic flake can pick up a charge differently than the other pigments or coating components, which can cause "picture framing" of the metallic flake. Use of particles that are bonded to the powder coating also has drawbacks; the bonding process is expensive and requires special equipment.

Accordingly, there remains a need for particles that can be successfully incorporated into powder coatings without altering the size and/or shape of the particles or diminishing the desired effect achieved by the particles.

SUMMARY OF THE INVENTION

The present invention is directed to methods for making composite flakes comprising mixing particles with one or more monomers or resins, curing the mixture, and fragmenting the cured product. A "composite flake" comprises more than one particle or parts of particles aligned in a polymer matrix. The matrix components are selected so as to yield a highly crosslinked material and/or a high molecular weight material upon cure. Flakes prepared according to this method are also within the scope of this invention, as are powder coatings comprising these flakes.

The composite flakes of the present invention have numerous advantages as compared with untreated particles or particles that are coated or treated in other ways. The flakes of the present invention comprise particles that are in a highly crosslinked and/or high molecular weight polymer matrix; while not wishing to be bound by any mechanism, the inventors believe that this unique matrix allows the flakes to pass through an extruder without significantly altering the effect of the flake. Powder coatings prepared with the extrudable, composite flakes of the present invention exhibit superior stain and/or chemical resistance as compared with coatings prepared using particles that are not treated according to the present invention. In addition, when the present powder coatings are sprayed electrostatically, the "picture frame" effect or separation that is often seen when using, for example, non-extruded metallic pigment, can be minimized. Because the present flakes can be extruded into the powder coatings described herein, the overspray when using the present coatings can be reclaimed more easily than when using other powder application methods; in such methods, wherein metallic flake or other pigments separate, what gets sprayed onto the desired substrate and the resulting overspray can be less than homogeneous. The present invention overcomes this to a large extent. Finally, it is believed that the polymer matrix around the particles make various pigments safer to handle.

DETAILED DESCRIPTION OF THE INVENTION

The present invention is directed to methods for making composite flakes comprising mixing particles with one or more monomers and/or resins or resin systems; curing the mixture; and fragmenting the cured product. The monomer(s) and/or resin(s) used in the present invention will yield a highly crosslinked material and/or a high molecular weight material when cured or set. In one embodiment of the present invention, one or more of monomers having ethylenic unsaturation are used, and cure is effected using actinic radiation. In another embodiment, the particles are mixed with one or more functional resins, such as those that are used in conjunction with one or more appropriate curing agents; curing is then effected by the appropriate mechanism, such as application of heat, air dry, and the like. In yet another embodiment, the particles are mixed with high molecular weight thermoplastic resins and subsequently allowed to set.

The particles treated according to the present methods can be any particles of any shape or size, regardless of whether they are typically used in powder coatings or not; the present methods can render previously unsuitable particles suitable for inclusion in powder coatings. In one embodiment, the particles are any particles that could be bent, deformed, oxidized and/or damaged when processed in an extruder or similar apparatus. In one embodiment, the particles are lamellar pigments or fillers, and can include those having a high aspect ratio. The platelets that comprise such high aspect ratio fillers and/or pigments typically have diameters of from about 1 to about 20 microns, such as about 2 to 5 or 10 microns. The aspect ratio of the platelets can be at least 5:1, such as at least 10:1 or 20:1, but can be as high as 200:1 to 10,000:1. Examples of suitable metallic particles include aluminum, stainless steel, bronze, copper, brass, and the like. Non-metallic particles include, for example, mica, coated mica, vermiculite, talc and the like. It will be appreciated that many of the particles treatable according to the present invention will have a special effect and/or will be electrically conductive. "Special effect" can include particles that have a metallic appearance or particles wherein the perceived color or appearance can change based upon viewing angle, lighting conditions, temperature, etc.

The particle used in methods of the present invention can be in any form. For example, the particles can be in a commercially available paste, dry powder, or suspended in liquid.

The size of the particles can vary depending on the needs of the user. In one embodiment, the average particle size is 45 microns or less. Other embodiments contemplate larger particle sizes.

In one embodiment, the particles are mixed with one or more monomers having ethylenic unsaturation. It will be appreciated that use of such monomers results in a coating that can be cured by actinic radiation. "Actinic radiation" will be understood by those skilled in the art as referring to UV cure, EB cure, and the like. Such monomers can include, for example, vinylic monomers such as styrene, alpha-methylstyrene, vinyltoluene, acrylonitrile, methacrylonitrile, vinyl acetate, vinyl propionate; acrylic acid; acrylic esters; methacrylic acid and methacrylic esters. Examples of acrylic esters include methyl acrylate, ethyl acrylate, n-butyl acrylate, 2-ethylhexyl acrylate, lauryl acrylate, stearyl acrylate, hydroxyethyl acrylate, phosphates of hydroxyethyl acrylate, hydroxypropyl acrylate, methoxyethyl acrylate, butoxyethyl acrylate, cyclohexyl acrylate and glycidyl acrylate. Examples of methacrylic esters include methyl methacrylate, ethyl methacrylate, isobutyl methacrylate, n-butyl methacrylate, tert-butyl methacrylate, 2-ethylhexyl methacrylate, lauryl methacrylate, stearyl methacrylate, oleyl methacrylate, methoxyethyl methacrylate, ethoxyethyl methacrylate, butoxyethyl methacrylate, hydroxyethyl methacrylate, phosphates of hydroxyethyl methacrylate, hydroxypropyl methacrylate, cyclohexyl methacrylate, glycidyl methacrylate, beta-methylglycidyl methacrylate, diethylaminoethyl methacrylate and gamma-methacryloxypropyl trimethoxysilane. Examples of di-functional acrylic esters include tetraethylene glycol diacrylate, 1,3-butylene glycol diacrylate, 1,4-butanediol diacrylate, 1,6-hexanediol diacrylate, neopentyl glycol diacrylate, polyethylene glycol diacrylate, dipropylene glycol diacrylate, tripropylene glycol diacrylate, ethoxylated bisphenol A diacrylate, cyclohexane dimethanol diacrylate, alkoxylated hexanediol diacrylate, alkoxylated hexanediol dimethanol diacrylate, propoxylated neopentyl glycol diacrylate, and alkoxylated aliphatic diacrylate. Examples of di-functional methacrylic esters include triethylene glycol dimethacrylate, tetraethylene glycol dimethacrylate, ethylene glycol dimethacrylate, polyethylene glycol dimethacrylate, 1,3-butylene glycol dimethacrylate, 1,4-butanediol dimethacrylate, diethylene glycol dimethacrylate, 1,6-hexanediol dimethacrylate, neopentyl glycol dimethacrylate, polyethylene glycol dimethacrylate, ethoxylated bisphenol A dimethacrylate, and cyclohexane dimethanol dimethacrylate.

Other suitable monomers include phosphoric acid derivatives, such as phosphoric esters having ethylenic unsaturation including, but not limited to, 2-methacryloyloxyethyl phosphate, di-2-methacryloyloxyethyl phosphate, tri-2-methacryloloxyethyl phosphate, 2-acryloyloxyethyl phosphate, di-2-acryloyloxyethyl phosphate, tri-2-acryloyloxyethyl phosphate, diphenyl-2-methacryloyloxyethyl phosphate, diphenyl-2-acryloyloxethyl phosphate, dibutyl-2-methacryloyloxyethyl phosphate, dibutyl-2-acryloyloxyethyl phosphate, dioctyl-2-methacryloyloxyethyl phosphate, dioctyl-2-acryloyloxyethyl phosphate, 2-methacryloyloxypropyl phosphate, bis(2-chloroethyl) vinyl phosphonate, and diallyidibutyl phosphonosuccinate. "Phosphoric acid derivative" will be understood as referring to a compound having a phosphoric acid moiety attached thereto.

Other monomers having at least three sites of ethylenic unsaturation can also be used, and include, for example, trimethylolpropane triacrylate, trimethylolpropane trimethacrylate, tris(2-hydroxyethyl) isocyanurate triacrylate, ethoxylated trimethylolpropane triacrylate, pentaerythritol triacrylate, propoxylated trimethylolpropane triacrylate, propoxylated glyceryl triacrylate, pentaerythritol tetraacrylate, dipentaerythritol tetraacrylate, di-trimethylolpropane tetraacrylate, and ethoxylated pentaerythritol tetraacrylate.

In one embodiment of the present invention, at least two monomers are used, wherein one of the monomers is a phosphoric acid derivative having at least one site of ethylenic unsaturation, and one of the monomers has three or four or more sites of ethylenic unsaturation, such as three or four or more acrylate groups [i.e. tri, tetra, or higher (meth) acrylate]. It will be appreciated by those skilled in the art that "(meth)acrylate" and like terms refers to both acrylate and methacrylate. In another embodiment of the present invention, all or some of the tri or tetra(meth)acrylate is replaced with di(meth)acrylate. In yet another embodiment of the present invention, one of the monomers is a phosphoric acid derivative having at least one site of ethylenic unsaturation, and one of the monomers is a di(meth)acrylate, wherein the di(meth)acrylate is present in greater than 10 parts by weight per 100 parts of the composition in which the particles are mixed.

When one or more of the monomers used in the present invention has ethylenic unsaturation, it may also be desirable to add one or more photoinitiators to the monomer(s)/particle mixture. Suitable photoinitiators will depend on the particular monomer selected, on the additives selected, and on the actinic radiation utilized, but generally include benzophenone, biphenoxy benzophenone, halogenated and amino functional benzophenones, fluorenone derivatives, anthraquinone derivatives, zanthone derivatives, thioxanthone derivatives, camphorquinone, benzil, alkyl ethers of benzoin, benzil dimethyl ketal, 2-hydroxy-2-methylphenol-1-propanone, 2,2-diethoxyacetophenone, 2-benzyl-2-N,N-dimethylamino-1-(4-morpholinophenyl) butanone, halogenated acetophenone, derivatives, sulfonyl chlorides of aromatic compounds, acylphosphine oxides and bis-acyl phosphine oxides, and benzimidazoles.

The monomer(s)/particle mixture can further include one or more additives, such as UV absorbers and stabilizers, rheology control agents, surfactants, charge control agents, catalysts, film build additives, fillers, flatting agents, defoamers, microgels, pH control additives, and other pigments. It may also be desirable to mix the particles, monomer(s), photoinitiator(s) and other additives in a solvent. Suitable solvents include aliphatic solvents, such as hexane, naphtha, and mineral spirits; aromatic and/or alkylated aromatic solvents, such as toluene, xylene, and SOLVESSO 100 (aromatic blend from Exxon Chemicals); alcohols, such as ethyl, methyl, n-propyl, isopropyl, n-butyl, isobutyl and amyl alcohol, and m-pryol; esters, such as ethyl acetate, n-butyl acetate, isobutyl acetate and isobutyl isobutyrate; ketones, such as acetone, methyl ethyl ketone, methyl isobutyl ketone, diisobutyl ketone, methyl n-amyl ketone, and isophorone, glycol ethers and glycol ether esters, such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate.

In another embodiment of the invention, the particles are mixed with one or more resins. Any number of resins or combinations thereof can be used, such as those that will produce a thermoplastic or a thermoset matrix, such as a one component or two component thermoset or a high molecular weight thermoplast. Examples of suitable resins include polyurethanes, acrylics, polyesters, siloxanes, polysulfides, epoxies, polyethylenes, polyethers, and combinations thereof. It will be appreciated that some of these resins will typically be used with one or more suitable curing agents, including polyisocyanates, aminoplasts, polyacids, polyols, polyanhydrides, polyepoxies, and combinations thereof. The appropriate curing agent(s) can be selected by one skilled in the art based upon the functionality of the resin(s) used.

As with the ethylenic unsaturation embodiment, any standard additives including thickeners, surfactants, catalysts, and the like can be used; again, the mixture can be prepared in a solvent, such as those listed above.

In one embodiment, the polymer matrix specifically excludes siloxane or silicone-comprising compounds. In another embodiment, the use of self-condensing melamine formaldehyde resins is specifically excluded.

The particles, one or more monomers and/or resins, and any additional additives can be mixed by any means suitable in the art. For example, the use of a paddle blade, cowles blade, or any other means of dispersing can be used.

Once adequate dispersion is achieved, the mixture is then coated onto a temporary substrate, such as a polyethylene web, drum, bell, roller or the like. The material can be applied to the temporary substrate by any number of methods including dipping, spraying, brushing, roll coating, gravure coating, curtain coating, flow coating, slot-die coating, or ink-jet coating. It will be appreciated that the thickness of the mixture deposited on the temporary substrate can be varied, such as by controlling the speed at which the mixture is deposited on the substrate. In one embodiment, the mixture is deposited so as to have a dry film thickness of about 0.1 to 15 microns, such as 1.0 to 5 microns or 2 to 3 microns. Thicker or thinner layers can be deposited, depending on the needs of the user.

After coating, the mixture is then cured or set. The manner of effecting cure will vary depending on the monomer(s) and/or resin(s) used. For example, if one or more monomers having ethylenic unsaturation are used, cure by actinic radiation is appropriate. If one or more thermosetting resins are used, a heat cure or air cure may be appropriate. If a high molecular weight, thermoplastic resin is used, the mixture will be allowed to cool and set. Therefore, once deposited on a temporary substrate, the substrate can be passed through or by the appropriate curing mechanism. For example, the substrate can be exposed to UV lamps, or can pass through an oven, depending on the type of monomer(s) and/or resin(s) used. The result of the cure is that the particles will be aligned in a highly crosslinked and/or high molecular weight polymer matrix.

Following cure, the cured mixture can then be removed from the temporary substrate, such as through an air knife or other suitable means. The process of air knifing the cured resin from the temporary substrate will cause the cured resin to fragment or fracture into flakes. The flakes can be further fragmented, if desired, by any suitable grinding means. The resulting flakes can vary in size depending on the needs of the user; for example, they can have a diameter anywhere from 1 micron to 20 millimeters. Particularly suitable for use in powder coatings are flakes having a diameter of 10 microns to 10 millimeters.

The present invention is further directed to composite flakes prepared according to the present methods. It will be appreciated that the composite flakes prepared as described above are a dry, solid product, and not a liquid or paste. This makes the flakes particularly suitable for use in powder coatings, in which the addition of liquids and/or paste is often undesirable. It will further be appreciated that the present methods do not result in individually encapsulated or coated particles, but rather will result in "fragments" that comprise more than one particle or parts of particles. These fragments or flakes, in contrast to individually encapsulated particles, provide particles or parts thereof that are aligned or oriented and that can be extruded. "Polymer matrix" and like terms as used herein refers to the cured or set resin that surrounds the particles and keeps them aligned in the flake; thus, it will be understood that the present flakes are distinct from particles in the art that are encapsulated in a nonresinous material or a waxy material. Such particles do not provide the same level of stain resistance as seen with the present flakes, and generally are not extrudable. In certain embodiments, the polymer matrix of the present invention is one that is highly crosslinked. "Highly crosslinked" will be understood by those skilled in the art as referring to a three dimensional extension vs. a linear extension. In certain embodiments, the polymer matrix of the present invention is one that is high molecular weight. "High molecular weight" refers to a number average molecular weight of 10,000 or greater, such as 50,000 or greater or 100,000 or greater. Although the inventors do not wish to be bound by any mechanism, it is believed that the use of a highly crosslinked and/or high molecular weight matrix allows the present flakes to be extruded or "extrudable". "Extrudable" refers to the ability to be passed through an extruder without significant physical alteration that is detrimental to the properties of the composite flake. The flakes of the present invention, which are extrudable, still obtain the desired effects for which they are used, even though the flakes are reduced in size during extrusion and grinding. For example, when aluminum is treated according to the present methods and extruded with the other components of a powder coating, there is an insignificant loss of luster in the final coating as compared with coatings containing extruded standard aluminum.

In one embodiment of the invention, the particles are within a polymer matrix that comprises at least one phosphoric acid derivative having at least one site of ethylenic unsaturation, and at least monomer that is a tri or tetra(meth) acrylate. In another embodiment of the present invention, the polymer matrix comprises at least one phosphoric acid derivative having at least one site of ethylenic unsaturation, and greater than 10 parts by weight of a di(meth)acrylate per 100 parts of matrix. In yet another embodiment of the present invention, the polymer matrix comprises a polyol and an aminoplast. Another embodiment of the present invention specifically excludes flakes having a polymer matrix comprising a self-condensing melamine, a silicone, or a siloxane. In one embodiment, the monomer(s) and/or resin(s) used to prepare the polymer matrix of the present invention do not exhibit modulated refractive index.

It will further be appreciated that the flakes according to certain embodiments of the present invention, prepared using ethylenic unsaturation and cured with actinic radiation, are distinct from particles admixed in suspension with monomers having ethylenic unsaturation and cured by free radical polymerization. In the present invention, the particles are aligned such that the plane of high aspect of each particle is substantially parallel to that of the composite flake, which is desirable. Furthermore it will be appreciated by one skilled in the art that the meso-scale and nano-scale structure of the polymer matrix in the vicinity of the particles will be more continuous in nature according to the present invention; the more continuous the better results. The actinic radiation cured system will exhibit a highly extended three dimensional polymer network over the nano- and meso-scale, as compared with particles encapsulated in co-suspension with monomer, which will show a more discontinuous polymer network.

The present invention is further directed to a powder coating composition comprising one or more flakes of the present invention and a film-forming resin system. The term "resin system" refers to one or more polymers or one or more polymers and curing agents. Any resin system that forms a film can be used. A particularly suitable resin system is one containing a polymer having at least one type of reactive functional group and a curing agent having functional groups reactive with the functional group of the polymer. The polymers can be, for example, acrylic, polyester, polyether or polyurethane and can contain functional groups such as hydroxyl, carboxylic acid, carbamate, isocyanate, epoxy, amide and carboxylate functional groups. The curing agents can be, for example, triglycidal isocyanurate, diglycidal isocyanurate, blocked isocyanates, uretidiones, hydroxyethylamides, glycolurils, and DGEBA based epoxies. The appropriate selection of polymer(s) and, if used, curing agent(s) is within the skill of one practicing in the art.

The use in powder coatings of acrylic, polyester, polyether and polyurethane polymers having hydroxyl functionality is known. Monomers for the synthesis of such polymers are typically chosen so that the resulting polymers have a glass transition temperature ("Tg") greater than 50° C. Examples of such polymers are described in U.S. Pat. No. 5,646,228 at column 5, line 1 to column 8, line 7, incorporated by reference herein. Acrylic polymers and polyester polymers having carboxylic acid functionality are also suitable for powder coatings. Monomers for the synthesis for acrylic polymers having carboxylic acid functionality are typically chosen such that the resulting acrylic polymer has a Tg greater than 40° C., and for the synthesis of the polyester polymers having carboxylic acid functionality such that the resulting polyester polymer has a Tg greater than 50° C. Examples of carboxylic acid group-containing acrylic polymers are described in U.S. Pat. No. 5,214,101 at column 1, line 59 to column 3, line 23, incorporated by reference herein. Examples of carboxylic acid group-containing polyester polymers are described in U.S. Pat. No. 4,801,680 at column 5, lines 38–65, incorporated by reference herein.

Carboxylic acid group-containing acrylic polymers can further contain a second carboxylic acid group-containing material selected from the class of C4 to C20 aliphatic dicarboxylic acids, polymeric polyanhydrides, low molecular weight polyesters having an acid equivalent from about 150 to about 750, and mixtures thereof. This material is crystalline and may be a low molecular weight crystalline or glassy carboxylic acid group-containing polyester.

Also useful in the present powder coating compositions are acrylic, polyester and polyurethane polymers containing carbamate functional groups. Examples are described in WO publication no. 94/10213, incorporated by reference herein. Monomers for the synthesis of such polymers are typically chosen so that the resulting polymer has a high Tg, that is, a Tg greater than 40° C. The Tg of the polymers described above can be determined by differential scanning calorimetry (DSC).

Suitable curing agents generally include blocked isocyanates, uretidiones, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group containing materials. Examples of blocked isocyanates are those described in U.S. Pat. No. 4,988,793, column 3, lines 1–36, incorporated by reference herein. Polyepoxides suitable for use as curing agents for COOH functional group-containing materials are described in U.S. Pat. No. 4,681,811 at column 5, lines 33–58, incorporated by reference herein. Polyacids as curing agents for epoxy functional group-containing materials are described in U.S. Pat. No. 4,681,811 at column 6, line 45 to column 9, line 54, incorporated by reference herein. Polyols, materials having an average of 2 or more hydroxyl groups per molecule, can be used as curing agents for NCO functional group-containing materials and anhydrides, and are well known in the art. Polyols for use in the present invention are typically selected such that the resultant material has a Tg greater than about 50° C. Anhydrides as curing agents for epoxy functional group-containing materials include, for example, trimellitic anhydride, benzophenone tetracarboxylic dianhydride, pyrrolmellitic dianhydride, tetrahydrophthalic anhydride, and the like as described in U.S. Pat. No. 5,472,649 at column 4, lines 49–52, incorporated by reference herein. Aminoplasts as curing agents for hydroxy, COOH, and carbamate functional group-containing materials are well known in the art. Examples of such curing agents include aldehyde condensates of glycol urea, which give high melting crystalline products useful in powder coatings. While the aldehyde used is typically formaldehyde, other aldehydes such as acid aldehyde, crotonaldehyde, and benzaldehyde can be used.

The film-forming resin described above is generally present in the present powder coating compositions in an amount greater than about 50 weight percent, such as greater than about 60 weight percent, and less than or equal to 95 weight percent, with weight percent being based on the total weight of the powder coating composition. For example, the weight percent of resin can be between 50 and 95 weight percent. When a curing agent is used, it is generally present in an amount of 5–50 weight percent; this weight percent is also based on the total weight of the powder coating composition.

Any of the flakes prepared as described above can be used in the present powder coatings. Typically, such flakes will be used in a weight percent of 0.1 to 30, such as 3 to 15. The size of these flakes will typically range from 1 micron to 20 millimeters, such as from 10 microns to 10 millimeters. It is significant that flakes of this size can be extruded with the other powder coating components to prepare the present powder coatings; particles having such a large size will typically be destroyed during extrusion. This exemplifies a significant advantage of the present invention. Because they are actually extruded with the other powder coating components, the flakes of the present invention will typically be fairly evenly distributed throughout the coatings; this is another advantage.

The powder coating compositions of the present invention may optionally contain additives such as waxes for flow and wetting, flow control agents such as poly(2-ethylhexyl) acrylate, degassing additives such as benzoin and microwax C, adjuvant resin to modify and optimize coating properties, antioxidants, ultraviolet (UV) light absorbers and catalysts. Examples of useful antioxidants and UV light absorbers include those available commercially from Ciba Specialty Chemicals under the trademarks IRGANOX and TINUVIN. These optional additives, when used, are typically present in amounts up to 20 weight percent, based on the total weight of the coating.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils, usually about 2 to 4 mils. Other standard methods for coating can be employed, such as brushing, dipping or flowing. As discussed above, the present powder coatings incorporating the particles of the present invention have enhanced performance during electrostatic spraying, as compared with other coatings prepared using particles that are not treated according to the present invention.

Generally, after application of the coating composition, the coated substrate is baked at a temperature sufficient to cure the coating. Metallic substrates with powder coatings are typically cured at a temperature ranging from 230° F. to 650° F. for 30 seconds to 30 minutes. The coating compositions of the invention can be applied to a variety of substrates, including metallic, such as aluminum and steel substrates, and non-metallic, such as wood, thermoplastic or thermoset (i.e. "polymeric") substrates including, for example, transparent plastic substrates, polycarbonate, and polymethylmethacrylate and elastomeric substrates such as thermoplastic polyolefin.

As noted above, the present coating compositions give superior stain and/or chemical resistance as compared with powder coatings using particles not treated according to the present invention. Use of the present coatings, therefore, can eliminate the need for a clear coat, which is often applied for the purpose of stain resistance. Such a clear coat can be used, however, if a high gloss finish is desired.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

A composition comprising a dispersion of aluminum flake was prepared via the following procedure: 260 g Sparkle Silver 5242-AR aluminum pigment from Silberline Manufacturing Co. Inc., Tamaqua, Pa., were dispersed using a rotary stirrer, fitted with a 1.5 inch diameter impeller blade, at 350 revolutions per minute in 610 g ethyl alcohol and 47.4 g Sipomer PAM 100 from Rhodia Inc., Cranbury, N.J. Seventy-two grams cellulose acetate butyrate from Sigma-Aldrich Company, Milwaukee, Wis., in 288 g n-butyl acetate was further added to this mixture under stirring at 350 revolutions per minute.

An ultraviolet radiation curable composition was prepared via the following procedure: 125 g 1,4-butanediol diacrylate, 120 g pentaerylhritol tetraacrylate, 120 g ethoxylated (4) pentaerythritol tetraacrylate, all from Sartomer Company, Exton, Pa. and 14.4 g diphenyl(2,4,6-trimethylbenzoyl)phosphine oxide/2-hydroxy-2-methylpropiophenone 50/50 blend (Sigma-Aldrich) were added to 1277.4 g of the above dispersion of aluminum flake. The mixture was filtered using a 5 micron nylon filter bag. Fifteen hundred grams of the ultraviolet radiation curable composition was applied via a slot-die coater from Frontier Technologies, Towanda, Pa. to a polyethylene terephthalate substrate and dried at 150° F. for 30 seconds and then ultraviolet radiation cured using a 100 W mercury lamp.

The cured, approximately 2 micron thick film was then removed from the polyethylene terephthalate substrate, yielding a dry solid powder, with metallic luster, the non-volatile matter content of which was greater than 99 percent.

Example 2

A composition comprising a dispersion of aluminum flake was prepared via the following procedure: 250 g Sparkle Silver 5242-AR aluminum pigment from Silberline Manufacturing Co. Inc., Tamaqua, Pa., were dispersed using a rotary stirrer, fitted with a 1.5 inch diameter impeller blade, at 350 revolutions per minute in 510 g ethyl alcohol and 5.0 g Sipomer PAM 100 from Rhodia Inc., Cranbury, N.J. Seventy-two grams cellulose acetate butyrate from Sigma-Aldrich Company, Milwaukee, Wis., in 288 g n-butyl acetate was further added to this mixture under stirring at 350 revolutions per minute.

An ultraviolet radiation curable composition was prepared via the following procedure: 250 g tripropylene glycol diacrylate, and 160 g ethoxylated (4) pentaerythritol tetraacrylate, both from Sartomer Company, Exton, Pa. and 14.4 g diphenyl(2,4,6-trimethylbenzoyl)phosphine oxide/2-hydroxy-2-methylpropiophenone 50/50 blend (Sigma-Aldrich) were added to 1125 g of the above dispersion of aluminum flake. The mixture was filtered using a 5 micron nylon filter bag. Fourteen hundred grams of the ultraviolet radiation curable composition was applied via a slot-die coater from Frontier Technologies, Towanda, Pa. to a polyethylene terephthalate substrate and dried at 150° F. for 30 seconds and then ultraviolet radiation cured using a 100 W mercury lamp.

The cured, approximately 2 micron thick film was then removed from the polyethylene terephthalate substrate, yielding a dry solid powder, with metallic luster, the non-volatile matter content of which was greater than 99 percent.

Example 3

A composition comprising a dispersion of aluminum flake was prepared via the following procedure: 130 g Sparkle Silver 5242-AR aluminum pigment from Silberline Manufacturing Co. Inc., Tamaqua, Pa., were dispersed using a rotary stirrer, fitted with a 1.5 inch diameter impeller blade, at 350 revolutions per minute in 305 g ethyl alcohol and 23.7 g Sipomer PAM 100 from Rhodia Inc., Cranbury, N.J. 36 g cellulose acetate butyrate from Sigma-Aldrich Company, Milwaukee, Wis., in 144 g n-butyl acetate was further added to this mixture under stirring at 350 revolutions per minute.

An ultraviolet radiation curable composition was prepared via the following procedure: 62.5 g 1,4-butanediol diacrylate, 60 g pentaerythritol tetraacrylate, 60 g ethoxylated (4) pentaerythritol tetraacrylate, and 0.36 g stearyl acrylate, all from Sartomer Company, Exton, Pa. and 7.2 g diphenyl(2,4,6-trimethylbenzoyl)phosphine oxide/2-hydroxy-2-methylpropiophenone 50/50 blend (Sigma-Aldrich) were added to 638.7 g of the above dispersion of aluminum flake. The mixture was filtered using a 5 micron nylon filter bag. Fifteen hundred grams of the ultraviolet radiation curable composition was applied via a slot-die coater from Frontier Technologies, Towanda, Pa. to a polyethylene terephthalate substrate and dried at 150° F. for 30 seconds and then ultraviolet radiation cured using a 100 W mercury lamp.

The cured, approximately 2.5 micron thick film was then removed from the polyethylene terephthalate substrate, yielding a dry solid powder, with metallic luster, the non-volatile matter content of which was greater than 99 percent.

Example 4

A composition comprising a dispersion of aluminum flake was prepared via the following procedure: 130 g Sparkle Silver 5242-AR aluminum pigment from Silberline Manufacturing Co. Inc., Tamaqua, Pa., were dispersed using a rotary stirrer, fitted with a 1.5 inch diameter impeller blade, at 350 revolutions per minute in 305 g ethyl alcohol and 23.7 g Sipomer PAM 100 from Rhodia Inc., Cranbury, N.J. 36 g cellulose acetate butyrate from Sigma-Aldrich Company, Milwaukee, Wis., in 144 g n-butyl acetate was further added to this mixture under stirring at 350 revolutions per minute.

An ultraviolet radiation curable composition was prepared via the following procedure: 62.5 g 1,6-hexanediol diacrylate, 60 g trimethylolpropane triacrylate, 60 g propoxylated (3) glyceryl triacrylate, and 0.36 g stearyl acrylate, all from Sartomer Company, Exton, Pa. and 7.2 g diphenyl(2,4,6-trimethylbenzoyl)phosphine oxide/2-hydroxy-2-methylpropiophenone 50/50 blend (Sigma-Aldrich) were added to 638.7 g of the above dispersion of aluminum flake. The mixture was filtered using a 5 micron nylon filter bag. Fifteen hundred grams of the ultraviolet radiation curable composition was applied via a slot-die coater from Frontier Technologies, Towanda, Pa. to a polyethylene terephthalate substrate and dried at 150° F. for 30 seconds and then ultraviolet radiation cured using a 100 W mercury lamp. The cured, approximately 2.5 micron thick film was then removed from the polyethylene terephthalate substrate, yielding a dry solid powder, with metallic luster, the non-volatile matter content of which was greater than 99 percent.

Example 5

Samples 1 to 7 were prepared using the ingredients and amounts (in grams) shown in Table 1. All formulas contain the same percentage of aluminum metal by weight. The samples were prepared as follows. The ingredients were weighed together and processed for ~20 s in a Prism blender at 3500 rpm's. This premix was then extruded through a b&p Process Equipment and Systems 19 mm, co-rotating, twin screw extruder at 450 rpm's, at temperatures ranging from 80° C. to 115° C. The resultant chip was milled and classified to a median particle size of 30 to 50 μm on a Hosokawa Micron Powder Systems Air Classifying Mill I. The formulas were then electrostatically sprayed using Nordson equipment onto steel panels coated with black electrodeposited primer supplied by ACT Laboratories as APR45254. Finally, the panels were baked in electric Despatch LAD series ovens. Samples were baked for a dwell time of 25 minutes at 375° F. All testing was run at a dry film thickness of 2.5 to 3.5 mils.

TABLE 1

| Material | Sample 1 | Sample 2 | Sample 3 | Sample 4 | Sample 5 | Sample 6 | Sample 7 |
|---|---|---|---|---|---|---|---|
| CRYLCOAT 450[1] | 93.0 | 93.0 | 93.0 | 93.0 | 93.0 | 93.0 | — |
| CRYLCOAT 7337[2] | — | — | — | — | — | — | 95.0 |
| TGIC[3] | 7.0 | 7.0 | 7.0 | 7.0 | 7.0 | 7.0 | — |
| PRIMID XL-552[4] | — | — | — | — | — | — | 5.0 |
| Benzoin | 0.5 | 0.5 | 0.5 | 0.5 | 0.5 | 0.5 | 0.5 |
| RESIFLOW PL-200[5] | 1.2 | 1.0 | 1.0 | 1.0 | 1.0 | 1.0 | 1.0 |
| IRGANOX 1076[6] | 1.0 | 1.0 | 1.0 | 1.0 | 1.0 | 1.0 | 1.0 |
| PCR-507[7] | 3.4 | — | — | — | — | — | c— |
| SILVET 760-20E[8] | — | 5.7 | — | — | — | — | — |
| Powder from Example 1 | — | — | 14.6 | — | — | — | 14.6 |
| Powder from Example 2 | — | — | — | 14.6 | — | — | — |
| Powder from Example 3 | — | — | — | — | 14.6 | — | — |
| Powder from Example 4 | — | — | — | — | — | 14.6 | — |
| L15 Value[9] | 46 | 71 | 76 | 76 | 80 | 76 | 78 |
| Flop Index[10] | 0.6 | 5.4* | 3.8 | 4.3 | 4.4 | 3.7 | 5.0 |
| Salt Spray Resistance (2 wks)[11] | No Staining | Heavily Stained | No Staining | No Staining | No Staining | No Staining | No Staining |
| Bleach Resistance[12] | No Staining | Obvious Staining | No Staining | Obvious Staining | Barely detectable | No Staining | No Staining |

*Poor hiding in this sample gives the illusion of higher flop since the black substrate is visible underneath. Uncoated APR45254 panels have a flop index of 11.2 and an L15 value of 24.
[1]Standard durable 33 AV functional polyester, from UCB Surface Specialties.
[2]Standard durable 33 AV functional polyester, from UCB Surface Specialties.
[3]Triglycidal Isocyanurate, from Vantico Limited.
[4]Hydroxyalkylamide crosslinker, from EMS-Chemie AG.
[5]Acrylic flow additive dispersed on silica, from Estron Chemical.
[6]Antioxidant, from Ciba Specialty Chemicals.
[7]Standard aluminum, from Eckart America.
[8]Extrudable aluminum, from Silberline.
[9]L15 is the measure of lightness of a panel at a viewing angle of 15 degrees from normal. It was measured using an X-rite multi-angle spectrophotometer.
[10]Flop Index is a measure of brightness shift when viewed at various angles. It was read using an X-rite multi-angle spectrophotometer and is calculated according to the following equation:

$$\text{Flop Index} = \frac{2.69(L15 - L110)^{1.11}}{L45^{0.86}},$$

Where L15 is the lightness value viewed at a 15 degree angle, L110 is the lightness viewed at a 110 degree angle, and L45 is the lightness value viewed at a 45 degree angle.
[11]Salt spray resistance was conducted according to ASTM Bill, and visually rated.
[12]Bleach resistance was run by placing ~3 mL of bleach on the panel under a watch glass and evaluated after 72 hours for degree of staining.

As can be seen from Table 1, the powder coating of the present invention had better appearance and staining than the coating made with a commercially available aluminum sold for extrusion with the coating (Sample 2). Although the standard aluminum flake that was extruded with the coating (Sample 1) does not show signs of staining, the appearance of the flake has been damaged to the point that any further darkening is not discernable.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for making composite flake comprising:
    (a) mixing particles having an aspect ratio of at least 5:1 with one or more monomers having ethylenic unsaturation;
    (b) curing the mixture of step (a) using actinic radiation; and
    (c) fragmenting the cured product of step (b),
    wherein the particles comprise metallic particles and/or non-metallic particles selected from mica, coated mica, vermiculite, and talc.

2. The method of claim 1, wherein the metallic particles are selected from aluminum, stainless steel, bronze, copper, and brass.

3. The method of claim 1, wherein the particles of step (a) have an average particle size of 45 microns or less.

4. The method of claim 1, wherein the particles of step (a) are introduced in the form of a paste.

5. The method of claim 4, wherein the particles are an aluminum paste.

6. A method for making composite flake comprising:
    (a) mixing particles having an aspect ratio of at least 5:1 with (i) at least one monomer that is a phosphoric acid derivative having at least one site of ethylenic unsaturation; and (ii) at least one monomer that is a di(meth)acrylate, wherein the amount of di(meth)acrylate is greater than 10 parts by weight per 100 parts of the monomer(s) used in step (a);
    (b) curing the mixture of step (a) using actinic radiation; and
    (c) fragmenting the cured product of step (b).

7. A method for making composite flake comprising:
    (a) mixing particles having an aspect ratio of at least 5:1 with (i) at least one monomer that is a phosphoric acid derivative having at least one site of ethylenic unsaturation; and (ii) at least one monomer that is a tri, tetra or higher (meth)acrylate;
    (b) curing the mixture of step (a) using actinic radiation; and
    (c) fragmenting the cured product of step (b).

8. The method of claim 1, wherein the mixture of step (a) further comprises a photoinitiator.

9. A method for making composite flake comprising:
    (a) mixing particles having an aspect ratio of at least 5:1 with one or more monomers having ethylenic unsaturation;
    (b) coating the mixture of step (a) onto a temporary substrate; and
    (c) curing the mixture of step (a) using actinic radiation by passing the substrate by the source of actinic radiation.

10. The method of claim 9, wherein the mixture of step (a) is coated onto the temporary substrate so as to have a dry film thickness after curing of 0.1 to 15 microns.

11. Composite flake prepared according to the method of claim 1, wherein the particles in the composite flake have an aspect ratio of at least 5:1.

12. Composite flake prepared according to the method of claim 6.

13. Composite flake prepared according to the method of claim 7.

14. A powder coating composition comprising:
    (a) the flake of claim 11; and
    (b) a film-forming resin system.

15. A powder coating composition comprising:
    (a) the flake of claim 12; and
    (b) a film-forming resin system.

16. A powder coating composition comprising:
    (a) the flake of claim 13; and
    (b) a film-forming resin system.

17. The powder coating of claim 14, wherein the flake is present in a weight percent of 0.1 to 30.

18. A method for making composite flake comprising:
    (a) mixing particles into a resin system comprising a resin selected from a polyurethane, an acrylic, a polyester, a siloxane, a polysulfide, an epoxy, a polyethylene, and/or a polyether;
    (b) setting or curing the mixture of step (a); and
    (c) fragmenting the product of step (b),
    wherein the particles comprise metallic particles and/or non-metallic particles selected from mica, coated mica, vermiculite, and talc.

19. The method of claim 18, wherein the particles have an aspect ratio of at least 5:1.

20. The method of claim 18, wherein the metallic particles are selected from aluminum, stainless steel, bronze, copper and brass.

21. The method of claim 18, wherein the particles of step (a) have an average particle size of 45 microns or less.

22. The method of claim 18, wherein the particles of step (a) are introduced in the form of a paste.

23. The method of claim 22, wherein the particles are an aluminum paste.

24. The method of claim 18, wherein the resin system comprises a polyol and an aminoplast.

25. The method of claim 18, wherein the resin system comprises a polyol and an isocyanate.

26. The method of claim 18, wherein the resin system comprises a cyanoacrylate resin.

27. The method of claim 18, wherein the cured resin system is a highly crosslinked polymer matrix.

28. The method of claim 18, wherein the cured resin system is a high molecular weight polymer matrix.

29. A method for making composite flake comprising:
    (a) mixing particles into a resin system comprising a resin selected from a polyurethane, an acrylic, a polyester, a siloxane, a polysulfide, an epoxy, a polyethylene, and/or a polyether;
    (b) coating the mixture of step (a) onto a temporary substrate; and
    (c) setting or curing the mixture of step (a) on the substrate using actinic radiation.

30. The method of claim 29, wherein the mixture of step (a) is coated onto the temporary substrate so as to have a dry film thickness after setting or curing of 0.1 to 15 microns.

31. Composite flake prepared according to the method of claim 18, wherein the particles in the composite flake have an aspect ratio of at least 5:1.

32. A powder coating composition comprising:
    (a) the flake of claim 31; and
    (b) a film-forming resin system.

33. A powder coating composition comprising:
(a) a composite flake prepared according to the method of claim 27; and
(b) a film-forming resin system.

34. A powder coating composition comprising:
(a) a composite flake prepared according to the method of claim 28; and
(b) a film-forming resin system.

35. The powder coating of claim 32, wherein the flake is present in a weight percent of 0.1 to 30.

36. The powder coating of claim 33, wherein the flake is present in a weight percent of 0.1 to 30.

37. The powder coating of claim 34, wherein the flake is present in a weight percent of 0.1 to 30.

* * * * *